United States Patent [19]

Leeson et al.

[11] 4,161,754

[45] Jul. 17, 1979

[54] TELEVISION CAMERA USABLE AS STUDIO OR PORTABLE UNIT

[75] Inventors: Stanley J. Leeson, Wickham Bishops, Near Witham; Norman A. Porter, Chelmsford, both of England

[73] Assignee: The Marconi Company Limited, Chelmsford, England

[21] Appl. No.: 844,182

[22] Filed: Oct. 21, 1977

[30] Foreign Application Priority Data

Nov. 6, 1976 [GB] United Kingdom ............... 46278/76

[51] Int. Cl.² .............................................. H04N 5/26
[52] U.S. Cl. ..................................... 358/185; 358/229
[58] Field of Search ............... 358/209, 225, 229, 185, 358/254

[56] References Cited

U.S. PATENT DOCUMENTS 4,002,831  1/1977  Aeschliman ......................... 358/254

Primary Examiner—Robert L. Richardson
Attorney, Agent, or Firm—Diller, Ramik & Wight

[57] ABSTRACT

The invention provides an outside broadcast or studio television camera in which the television camera tube is provided as a separable unit which can be removed from the relatively bulky main housing of the camera and used as a portable camera unit.

5 Claims, 2 Drawing Figures

TELEVISION CAMERA USABLE AS STUDIO OR PORTABLE UNIT

This invention relates to television cameras.

Conventionally a television camera of the studio or outside broadcast type consists of a relatively unwieldy encased apparatus consisting of a lens system or lens systems, a television camera tube and control processing circuitry. For many proposes such a camera is not convenient because of its sheer size and bulk and for this reason use is commonly made of supplementary portable television cameras which are hand held or mounted from a shoulder strap or light tripod. In general, control and processing circuitry for such portable television cameras is provided in a support unit.

The present invention seeks to provide an improved television camera of the studio or outside broadcast type in which the need for an independent portable television camera equipment is avoided.

According to this invention, a television camera of the studio or outside broadcast type is provided comprising a television camera tube and associated control and processing circuitry and a housing therefor and wherein said television camera tube is provided in a separable unit which may be removed from said housing and utilised, with circuitry remaining within said housing, as a portable camera.

Said separable unit may be provided to be fitted to a shoulder mount or a tripod when removed from said housing.

Said separable unit may include an optical lens system for use both when within said housing or removed therefrom, with or without a further lens system fitted to said housing.

Preferably, however, the arrangement is such that said separable unit operates with a conventional studio or outside broadcast lens fitted to said housing when within said housing and may be fitted with a smaller lens when removed therefrom and used as a portable camera.

Figure 1:
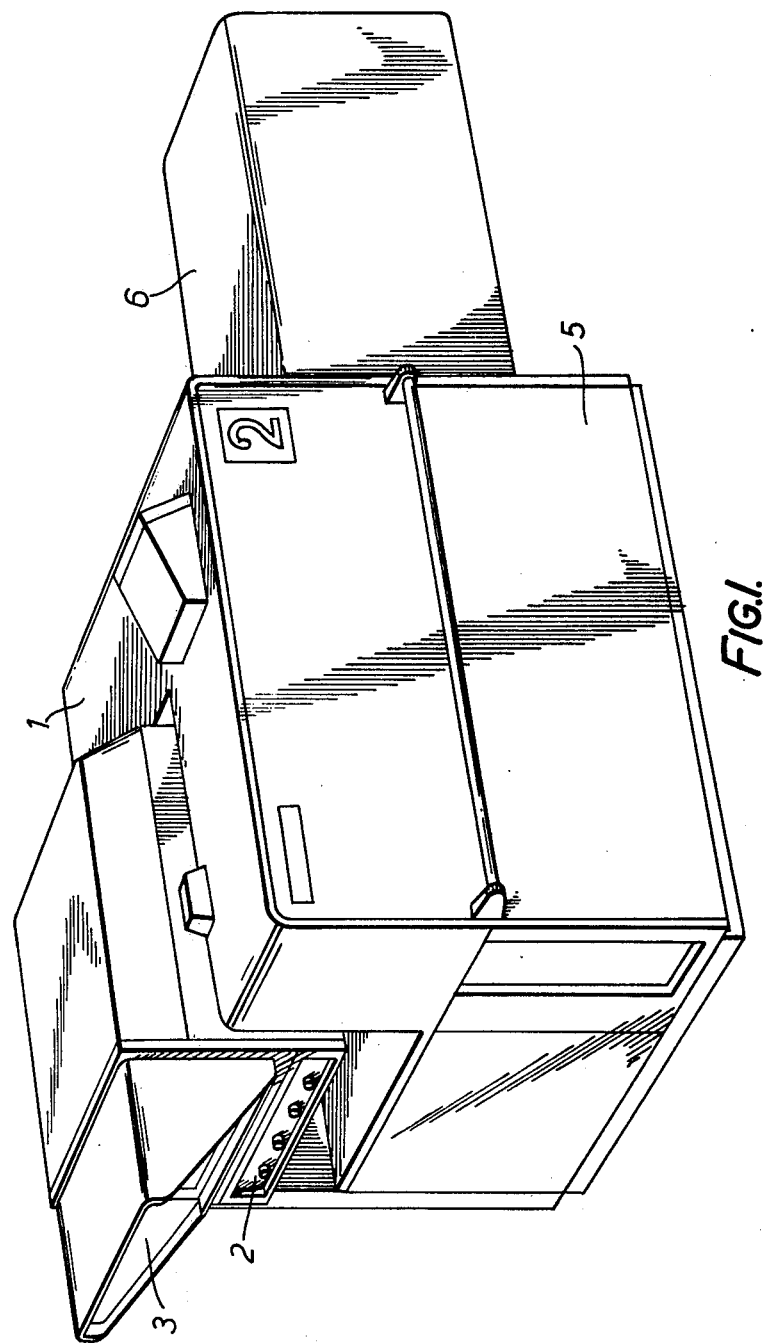
Figure 2:
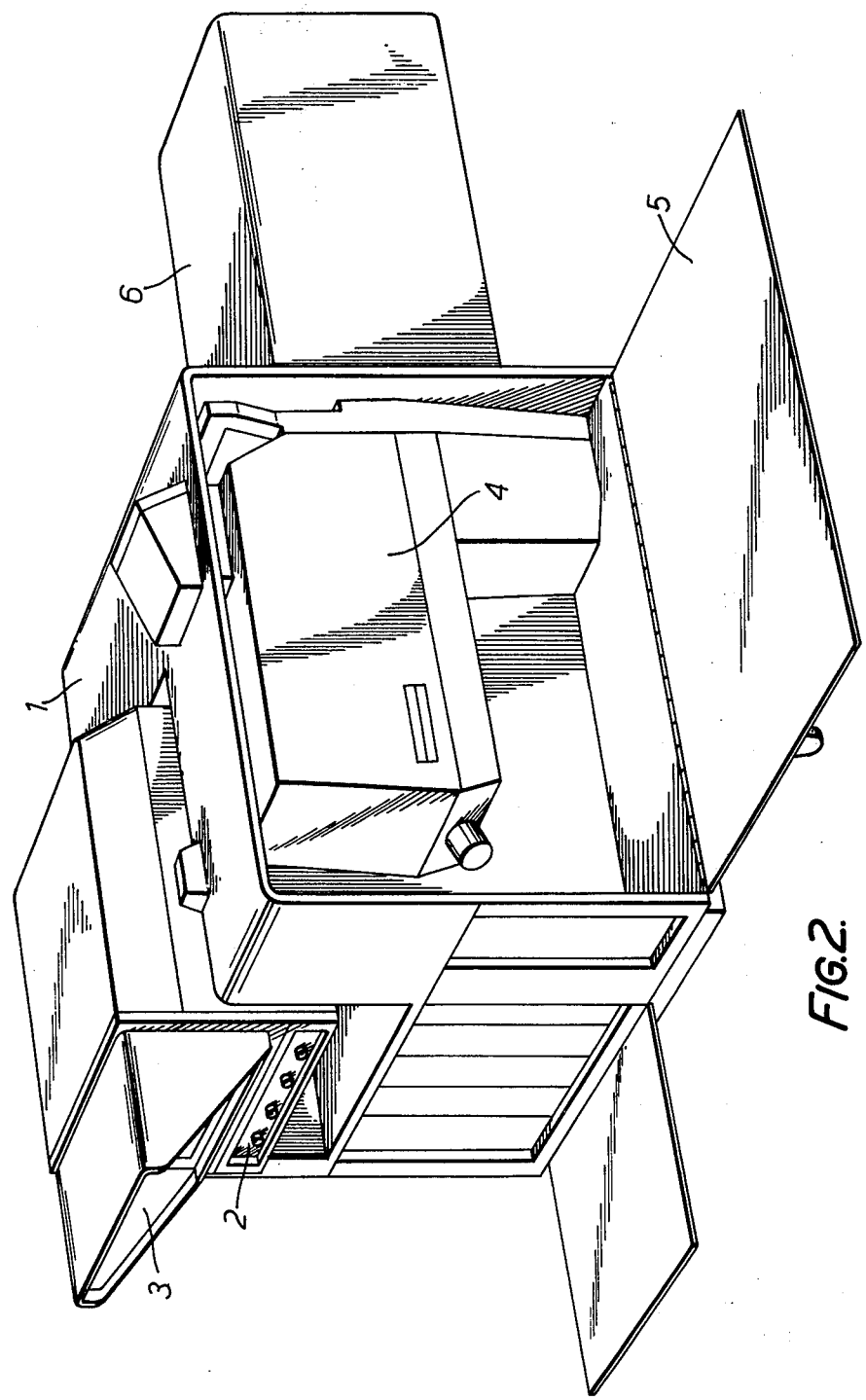

The invention is illustrated in and further described with reference to the accompanying drawings in which, FIG. 1 is a perspective view of one television camera of the studio or outside broadcast type in accordance with the present invention, and FIG. 2 is a perspective view showing the same camera as is shown in FIG. 1, but with a side panel open to give access to the separable unit which may be utilised as a portable camera.

Referring to the drawings, it is believed that these are largely self-explanatory. The camera consists of a housing 1 within which is a television camera tube and associated control and processing circuitry, the circuitry being as well known per se. External controls and a view finder may be seen at 2 and 3 respectively. Externally, as seen from FIG. 1, the camera may be taken as a conventional studio or outside broadcast camera. However, the television camera tube itself is provided as a separable unit, shown at 4 in FIG. 2, which may be removed and utilised, with control and processing circuitry remaining within the housing 1, as a portable camera mounted on a shoulder mount or a tripod. Access to the separable unit 4 is gained by opening a side panel 5 of the main housing 1.

As removed, the separable unit 4 has no lens system of its own. When used within the housing 1, optical input is derived from a conventional studio or outside broadcast lens system within appendage 6.

The separable unit 4 is provided to be fitted with a small lens at its input end when removed from the housing 1 and utilised as a portable camera.

This particular example of television camera is a colour television camera, but the invention is, of course, equally applicable to a monochrome television camera.

We claim:

1. A television camera of the studio or outside broadcast type comprising a television camera tube and associated control and processing circuitry and a housing therefor and wherein said television camera tube is provided in a separable unit which may be removed from said housing and utilised, with circuitry remaining, within said housing, as a portable camera.

2. A television camera as claimed in claim 1 and wherein said separable unit is provided to be fitted to a shoulder mount or a tripod when removed from said housing.

3. A television camera as claimed in claim 1 and wherein said separable unit includes an optical lens system for use both when within said housing or removed therefrom.

4. A television camera as claimed in claim 3 and wherein a further lens system is fitted to said housing.

5. A television camera as claimed in claim 1 and wherein the arrangement is such that said separable unit operates with a conventional studio or outside broadcast lens fitted to said housing when within said housing and may be fitted with a smaller lens when removed therefrom and used as a portable camera.